(12) United States Patent
Streuber

(10) Patent No.: US 6,465,111 B1
(45) Date of Patent: Oct. 15, 2002

(54) METAL FOAM JOINTING METHOD

(76) Inventor: Fritz Michael Streuber, Bakusbrink 27, 32120 Hiddenhausen (DE)

( * ) Notice: Subject to any disclaimer, the term of this patent is extended or adjusted under 35 U.S.C. 154(b) by 0 days.

(21) Appl. No.: 09/448,133

(22) Filed: Nov. 24, 1999

(30) Foreign Application Priority Data

Nov. 24, 1998 (DE) .......................... 198 54 175

(51) Int. Cl.⁷ .................. B32B 3/00; B32B 15/02; B22F 19/04; B22D 19/04
(52) U.S. Cl. .................. 428/613; 428/598; 428/595; 164/79; 164/108; 164/111
(58) Field of Search ................. 428/613, 586, 428/582, 598, 599, 603, 595; 164/108, 111, 79

(56) References Cited

U.S. PATENT DOCUMENTS

| | | | |
|---|---|---|---|
| 3,711,363 A | * 1/1973 | Jarema et al. | 428/613 |
| 3,832,820 A | 9/1974 | Eggert | 52/753 T |
| 3,834,881 A | * 9/1974 | Niebylski | 428/613 |
| 3,848,666 A | * 11/1974 | Valdo | 165/168 |
| 5,151,246 A | 9/1992 | Bauneist et al. | 419/2 |
| 5,482,533 A | * 1/1996 | Masuda et al. | 75/415 |
| 5,564,064 A | * 10/1996 | Martin | 419/5 |
| 5,888,600 A | * 3/1999 | Wycech | 428/35.9 |
| 6,135,542 A | * 10/2000 | Emmelmann et al. | 296/205 |

FOREIGN PATENT DOCUMENTS

| | | |
|---|---|---|
| DE | 2 147 063 | 5/1972 |
| DE | 41 01 630 C2 | 12/1991 |
| DE | 44 26 627 C2 | 2/1993 |
| DE | 43 18 540 A1 | 12/1994 |
| DE | 44 16 371 A1 | 11/1995 |
| DE | 196 12 781 C1 | 8/1997 |
| DE | 197 17 894 A1 | 11/1997 |
| EP | 0 744 586 | 11/1996 |
| EP | 0 844 167 A2 | 5/1998 |
| FR | 1155740 | 5/1958 |
| JP | 54-73349 | * 6/1979 |
| JP | 60-294 | * 1/1985 |
| JP | 63-271093 | * 11/1988 |
| JP | 10-058575 | 3/1998 |
| JP | 10-175567 | 6/1998 |
| WO | WO 97/11843 | * 4/1997 |

OTHER PUBLICATIONS

European Search Report of EP 99 12 3135 dated Oct. 19, 2000.

Sedliaková, N.; Simančik, F.; Kováčik; and Minár, P., "Joining of Aluminium Foams," *Metallschäume*, 1997, pp. 177–185, MIT Bremen, Germany (no month).

* cited by examiner

*Primary Examiner*—John J. Zimmerman
(74) *Attorney, Agent, or Firm*—Ratner & Prestia

(57) ABSTRACT

In a metal foam jointing method for joining preformed bodies, a first preformed body (1) and a second preformed body (1, 2) are located in fixed positions relative to each other. By means of a jointing clamp (10), an encasement of a space (9) is formed in a jointing zone of the preformed bodies (1, 2) in which foamable metal foam material (17) is disposed. The metal foam material is foamed in the encasement, as a result of which the preformed bodies (1, 2) are compacted into a composite body.

18 Claims, 12 Drawing Sheets

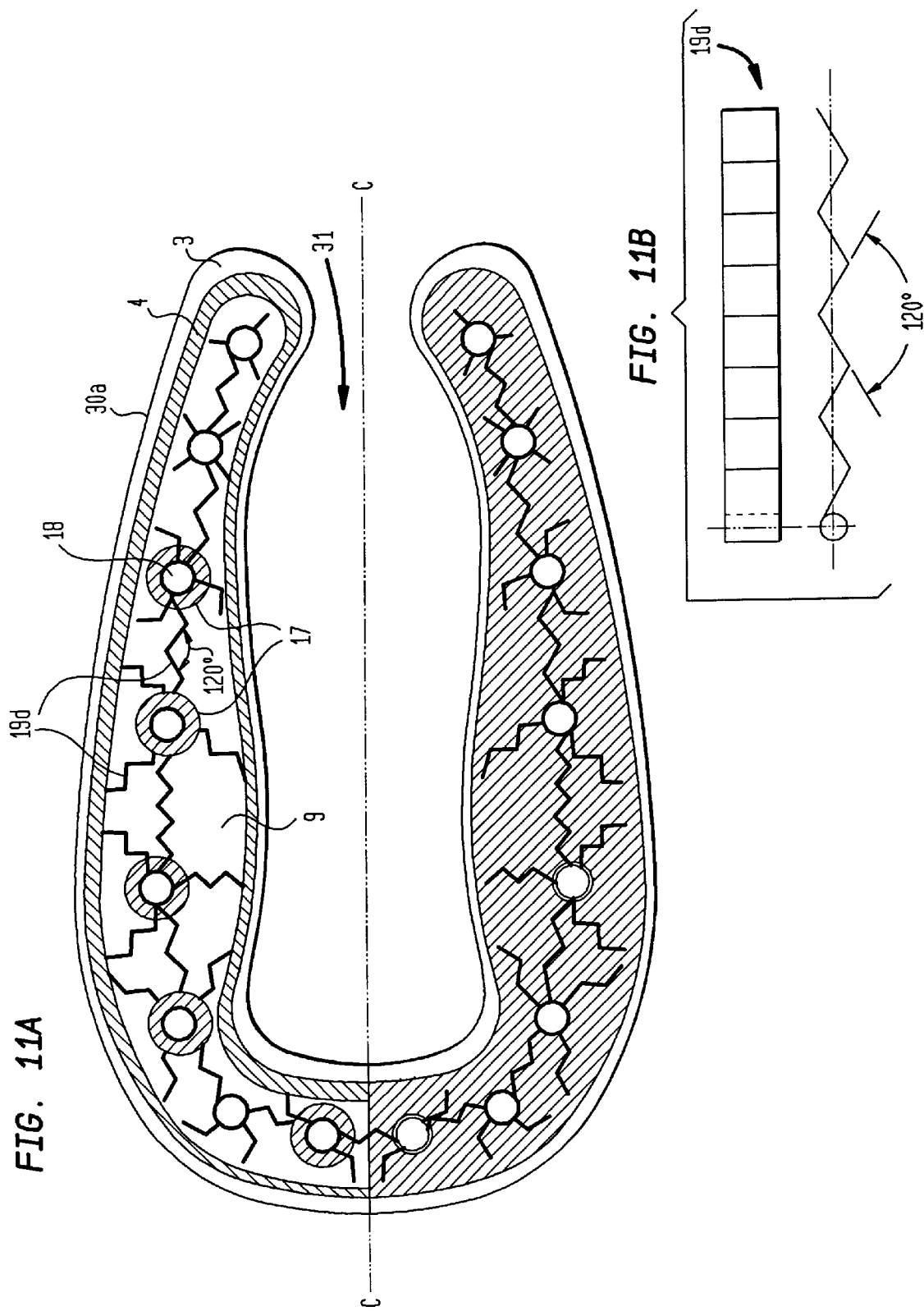

METAL FOAM JOINTING METHOD

BACKGROUND OF THE INVENTION

1. Field of the Invention

The invention relates to a metal foam jointing method, a preformed body composite formed by foaming a metal foam material, and a jointing clamp for clamping the preformed bodies to be joined.

It is especially true in lightweight structural engineering that there has always been a problem in joining individual structures—termed preformed bodies in the following—in keeping with the requirements of the later application, not least due to the demand for low weight while at the same time ensuring high mechanical loading capacity and stability at low cost. This is also basically a problem in other fields, for instance, in shipbuilding where particularly large-area preformed bodies, for example hull segments, need to be joined to each other, although here too, there is always the requirement for the smallest deadweight possible while assuring high mechanical loading capacity of such preformed bodies and the composite bodies composed thereof.

2. Description of Related Art

One possibility of saving weight is to make use of preformed bodies of foamed metal foam material or proportions of such materials. Due to the cellular structure of its frothed metal foam, a foamed metal preformed body has a lower weight than a preformed body produced from the solid while still assuring high mechanical loading capacity. Aside from this, metal foam material features a whole series of advantageous properties, such as, for instance, high shock absorption, noise absorption, as well as reduced heat conductivity and electrical conductivity as compared to the solid material. Metal foam materials and slabstock and preformed bodies produced therefrom are known, for example, from DE 41 01 630 C2, DE 43 18 540 A1, DE 44 16 371 A1, DE 44 26 627 A1, DE 196 12 781 01 C1 and DE 197 17 894 A1. Proposed in DE 43 18 540 A1 is the use of metal foam material in automobile production, in which body panels are employed as foamed metal preformed bodies, comprising a solid metal skin and a foamed layer of metal foam. For securing fitted items to these body panels, mention is made of self-cutting screws and dowel-type fasteners. DE 196 12 781 01 C 1, likewise, relates to preformed bodies for motor vehicles. In the publication "Metallschaume 1997", MIT Bremen, the paper "Joining of Aluminum Foams" by N. Sedliakova et. al. describes screw fasteners, soldered, cemented and welded joints as well as the use of fasteners foamed-in-place as methods for joining foamed metal preformed bodies. These are the accepted methods for joining preformed bodies, the advantages and disadvantages of which are well known in engineering.

SUMMARY OF THE INVENTION

An object of the present invention is to provide a particularly secure composite of preformed bodies and to provide the jointing technique required therefore.

In accordance with the invention, preformed bodies are compacted into a solid composite body in a jointing method with the aid of a metal foam material. For this purpose, in a first step, the preformed bodies to be joined are located fixedly relative to each other in positions as desired for the composite, preferably by being clamped to each other. In their jointing zone, use is made of a jointing clamp to define a space, more particularly a cavity, to thus form an encasement in which foamable metal foam material is arranged. The metal foam material may be introduced into the space encased by the jointing clamp either prior to, during, or after joint clamping. In a second step, the foamable metal foam material is foamed, this being preferably done by heating it to the foaming temperature of the metal foam material. Due to the increase in volume of the metal foam material involved in foaming and the definition thereof by the sufficiently solid encasement, the preformed bodies are compacted into a composite body.

In a preformed body composite in accordance with the invention, the preformed bodies are joined together by means of a jointing clamp which forms an encasement for a metal foam material foamed in producing the composite. The jointing clamp defines a space, at least in part, in which the metal foam material is able to expand in foaming. Due to the increase in volume of the metal foam material into the limits dictated by the encasement, the preformed bodies are compacted into a composite.

In a first preferred embodiment, a prefabricated separate jointing clamp is employed as the jointing clamp. This separate jointing clamp is placed on the preformed bodies to be joined—the preformed bodies having been preferably arranged matching each other in the shape of the later composite—by it clasping the preformed bodies or at least parts thereof. In this arrangement, the jointing clamp may already clampingly locate the preformed bodies to be joined together in the desired position relative to the composite. A non-clamping application of the jointing clamp is likewise possible, however.

In accordance with a second preferred embodiment, the jointing clamp is formed by the corresponding configuration of the preformed bodies themselves so that applying a separate jointing part, preferably the aforementioned separate jointing clamp, may be eliminated. In this case, the jointing clamp is an integral component of one of the preformed bodies or is formed in the cooperation of the preformed bodies.

The foamable metal foam material may be a constituent of one, several or all preformed bodies involved in the composite, Thus, a preformed body, used preferably, is fabricated from a slab of laminated material comprising at least one layer of a foamable metal foam material and an adjoining skin of a metallurgically compatible solid metal material. From such a semi-finished product, a preformed body in the sense of the invention is produced by known forming methods, more particularly cold forming. Typically, the foamed material and solid material is formed each by the same metal or the same metal alloy, for example, foamable aluminum foam and solid aluminum. However, any compatible, unlike pairing of materials is just as usable for the purposes of the invention, the foaming temperature of the foam material being preferably below the melting temperature of the solid material. The foam material of one or more preformed bodies may be foamed even prior to jointing. One or more of the preformed bodies to be joined may also consist only of the metal foam material.

However, the invention is not restricted to application with preformed bodies containing foam metal materials, it also being applicable to advantage also with metallic preformed bodies having no foam material, for example as with conventional sheets of metal or other section or shell bodies. Preformed bodies obtained by sintering or casting, for example, may be involved. The invention is, although preferred, not restricted exclusively to joining metallic preformed bodies. In principle, any kind of preformed bodies may be joined into a composite in accordance with the invention by means of the jointing system in accordance with the invention, as long as these preformed bodies are not ruined by the foaming temperature of the foam material used in each case; preferably they should remain dimensionally stable at the foaming temperature.

The jointing clamp defines or encases in the jointing zone a space in which a supplemental section of a foamable metal foam material may be inserted before, during or after positioning of the jointing clamp. By inserting a suitable supplemental section, foam material may be incorporated in the jointing zone optimized in quantity and form as regards the foaming procedure and later compacted composite. In this way, should the preformed bodies to be joined not contain any foamable metal foam material themselves in the jointing zone, foam material is furnished at least by a supplemental section.

As a further, or also sole, means of introducing foamable metal foam material into the jointing zone, a prefabricated separate jointing clamp may also be used.

A separate jointing clamp in accordance with the invention comprises, in a tubular cylindrical section, a layer of a foamable metal foam material and a skin surrounding this foam layer, i.e. encasing the metal foam material of such a sandwiched foam layer during foaming. In its simplest embodiment, such a jointing clamp may be used like a sleeve for joining two abutting cylindrical preformed bodies. Preferably, the jointing clamp is provided with an opening in its tubular cylindrical section, however. The opening extends to advantage up to at least one face end of the tubular cylindrical section and in particular, it being configured preferably as a full-length opening so that the tubular cylindrical section of the jointing clamp is open throughout longitudinally. The separate jointing clamp may also be formed as a tubular section, in which at least one foamable supplemental section is inserted, which is foamed prior to jointing or in the course thereof and subsequently stiffens the tubular section of the jointing clamp.

In the embodiment provided with the opening, the separate jointing clamp is fitted, mounted, pushed in place or otherwise suitably fixedly located relative to the preformed bodies placed in accordance with each other on joining sections configured accordingly on the preformed bodies. In the starting position prepared for foaming, joining sections of the preformed bodies to be jointed thus protrude into the cavity defined by the jointing clamp. Preferably, a joining section protrudes into the space encased by it also when a jointing clamp is configured integrally. A joining section of a preformed body may be formed at one edge of the preformed body or also at any other joining location of the preformed body serving to make the joint.

The preformed bodies may also be held together in the location desired in the composite by means of the jointing clamp, more particularly, by the separate jointing clamp.

In a likewise preferred aspect, clamps or other suitable fixing means for locating the preformed bodies relative to each other may be used in addition to the jointing clamp, which may be configured separately or integrally.

The jointing material used in accordance with the invention, namely foamable metal foam material, may be included in the jointing zone by the preformed bodies themselves to be joined, by a separate jointing clamp or by one or more supplemental sections. To particular advantage use is made of combinations of these foam metal inclusions, more particularly a combination of all three possibilities.

Should more than two preformed bodies abut in a common jointing zone, such a preformed body composite may be produced particularly simply by using a separate jointing clamp. The jointing clamp provided for this purpose may be formed for example by a star-shaped jointing clamp tubular section.

Since the foam material comprises a cellular structure in the jointing zone during and after foaming, and thus, as is known, has a reduced heat conductivity as compared to that of the solid material, the jointing zone, i.e. the space encased by the clamp, is thermally treated from within. In addition to cooling in terminating foaming or for accelerated cooling after foaming, it may be of advantage to internally heat the foam material for the purpose of foaming. The thermal treatment means for cooling, or for heating, or also for cooling and heating, may be formed in principle by any suitable cooling or heating means, for example by the application of electrical energy. Preferably, the thermal treatment means is formed, however, by at least one flow conduit, through which the cooling or heating fluid is guided. The flow conduit may be perforated to bring the thermal treatment means into direct contact with the foam material.

In another preferred aspect, the metal foam material is charged from within by a fluid, preferably an inert gas or reaction gas, by means of which the oxidative effect of a foaming agent contained in the foamable metal foam material is reduced or increased. A perforated flow conduit, arranged for this purpose in the jointing zone, may be formed by the aforementioned thermal treatment conduit, although, a separate further conduit having small openings, i.e. a perforated conduit, may be incorporated.

The thermal treatment fluid and the fluid for controlling an oxidation may be formed by one and the same fluid.

BRIEF DESCRIPTION OF THE DRAWINGS

Preferred example embodiments will now be detailed with reference to the figures in which:

FIGS. 11a and 11b are a cross-sectional view of a tubular section, including thermal treatment conduits and spacers in accordance with FIG. 9d and a plan view and side view thereof.

DESCRIPTION OF THE PREFERRED EMBODIMENTS

Figure 1A:
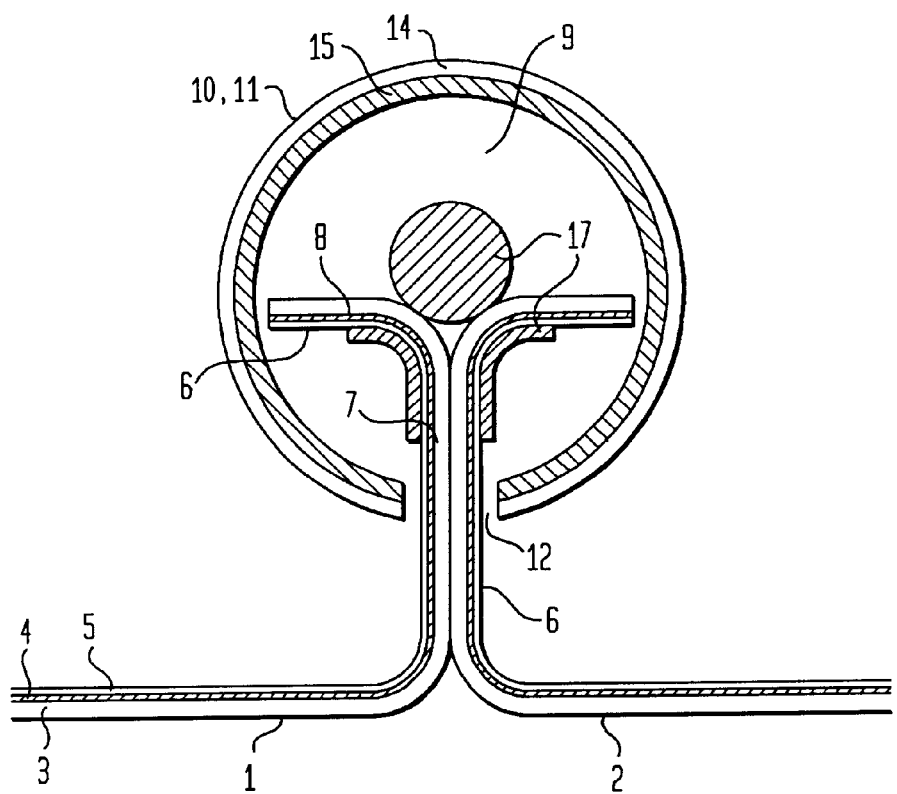
FIG. 1a is a cross-sectional view of two preformed bodies and a jointing clamp in position for a joint.

Referring now to FIG. 1a, illustrated is a cross-sectional view through a jointing zone of a first preformed body 1 and a second preformed body 2. The preformed bodies 1 and 2 are segments preformed in accordance with the later intended purpose, for example, body panels of a motor vehicle or hull or fuselage segments of a ship and aircraft respectively. For producing the preformed bodies 1 and 2, slabstock is used consisting of a foamable layer 4 of a metal foam material sandwiched between a lower and an upper solid metal skin 3 and 5 respectively. The laminated composite in the slabstock for the preformed bodies 1 and 2 may be fabricated for example by means of cementing or diffusion bonding, it being from such a slabstock that, after parting, the preformed bodies 1 and 2 are obtained by cold forming.

Configured by double folding at each of the preformed bodies 1 and 2 along one of its side edges is a joining section 6. Such a joining section 6 in the form of a flanged edge comprises a first web 7, jutting from the corresponding preformed body 1 and 2 respectively, and a second web 8 adjoining thereto, folded back to the same preformed body. In the example embodiment, the second web 8 runs parallel to, and spaced away from, the end portion of the corresponding preformed body 1 and 2 respectively located below. To produce a preformed body composite, the preformed bodies 1 and 2 are located and locked in place with their joining sections 6 abutting. Subsequently, a jointing clamp 10 is applied so that the abutting joining sections 6 are clasped by the jointing clamp 10.

The jointing clamp 10 is formed by a tubular cylindrical section 11 of circular cross-section, which, in its longitudinal direction, is opened up by the straight opening 12, extending from one face to the other. The jointing clamp 10 is likewise produced from a metal foam slabstock. For this purpose, the slabstock is cut into a rectangular shape and is cold formed into the tubular cylindrical section, for example, bent or rolled. It is just as possible to produce it from a tubestock by machining the longitudinal opening 12. The semi-finished product of the jointing clamp 10 is likewise a laminate, in the example embodiment as shown in FIG. 1a it is a two-layer material, comprising a foamable layer 15 of a metal foam material and a solid metal skin 14 of the same metal. Forming a composite between the two layers 14 and 15 may be done, for example, by cementing or diffusion bonding. In the tubular cylindrical section 11, the foamable layer 15 forms the inner layer sandwiched by the outer skin 14.

After lay-up, the jointing clamp 10 clasps the two abutting joining sections 6. Their longitudinal edges define the opening 12 located on both sides of the joining sections 6 in the region of the first webs 7. Between the first webs 7 and the longitudinal edges of the jointing clamp 10, a gap remains. The second webs 8, facing away from each other, are located in the region of the largest cross-sectional extent of the tubular cylindrical section 11. The jointing clamp 10 is pushed into place lengthwise on the joining sections 6, since it is itself not deformable.

The jointing clamp 10 is held in the location as shown, in which it encases the jointing zone with the two joining sections 6 like a shell. In the example embodiment, it is held positioned relative to the preformed bodies 1 and 2 by retainers. However, in principle, the jointing clamp 10 may also be formed with a slight elasticity so that, in the shown starting position of the preformed bodies 1 and 2, it already clamps and locates the two preformed bodies in this starting position, more particularly, by it pressing the webs 7 against each other in the region of the opening 12 of the jointing clamp 10. It would also be possible, if the preformed bodies 1 and 2 and the jointing clamp 10 are correspondingly adapted in shape, to positively retain the jointing clamp 10 in the desired position for the composite, i.e. riding the preformed bodies 1 and 2 or their joining sections 6 prior to foaming. The jointing clamp 10 is, in any case, sufficiently inherently stiff so that it is able to exert the encasing function and the clamping function involved in later foaming of the metal foam material.

After, or also before, locating the jointing clamp 10, supplemental sections 17 of a foamable metal foam material are inserted in a space 9, sheathed by the tubular cylindrical section 11, more particularly, by the skin 14. The supplemental sections 17 serve to set the amount of foam material and the subsequently resulting density of the foam material foamed within the space 9, defined by the tubular cylindrical section 11. The shape of such supplemental sections and the quantity of the foamable metal foam material introduced thereby is selected in accordance with the geometry of the tubular cylindrical section 11 and of the joining sections 6, jutting into the tubular cylindrical section 11, thus making it possible to precisely adapt the metal foam material, present in the space 9, in shape and quantity. Another possibility of adapting to shape and quantity is to machine the metal foam material, for example, from the foamable layer 15 of the jointing clamp 10.

Figure 2A:
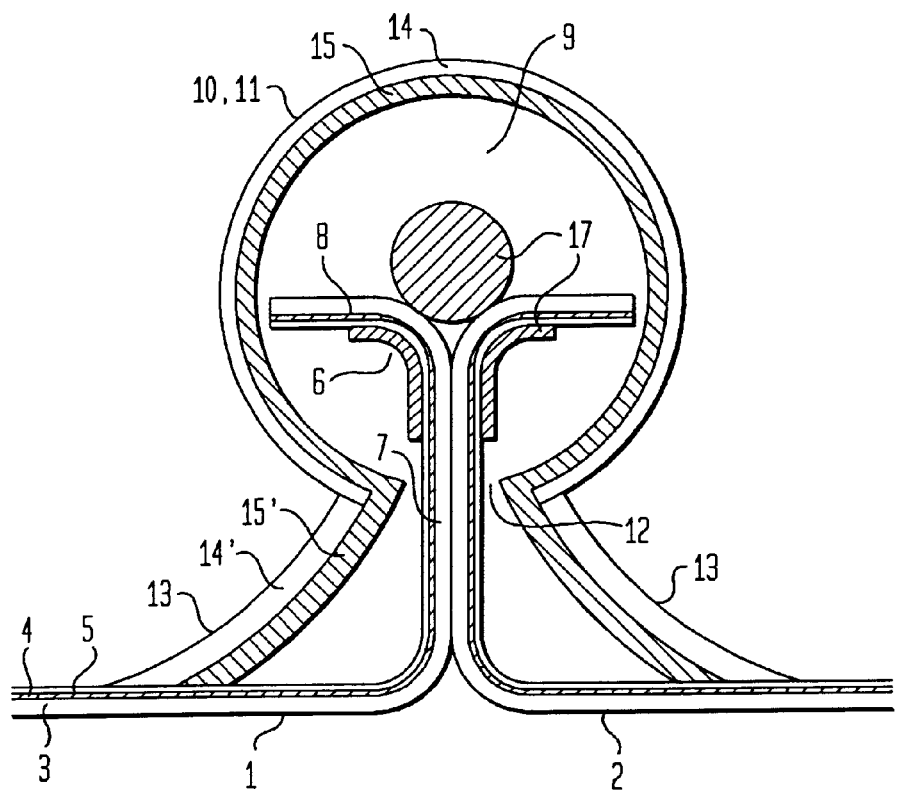
FIG. 2a is a cross-sectional view of two preformed bodies and a jointing clamp, including a sustaining section, in position for a joint.

Referring now to FIG. 2a, illustrated is a second embodiment of a jointing clamp 10. In this jointing clamp 10, a sustaining section 13 is located along each side of the opening 12 of the jointing clamp tubular section 11. Such a sustaining section 13 may be formed, for example, by bending it already in the course of forming the tubular cylindrical section 11. By its free longitudinal edge, such a sustaining section 13 is seated on one of the preformed bodies 1 and 2 in the located condition of the jointing clamp 10. In a horizontal orientation, no additional support is needed for this jointing clamp 10. Each of the sustaining sections 13 forms a cross-strutting between each of the preformed bodies 1 and 2 and the joining section 6 protruding upwards from the preformed body. The sustaining sections 13 additionally stiffen the preformed body composite, as a result of which any tendency to deform, for example any tendency to twist, of the individual preformed bodies 1 and 2 may be counteracted. The sustaining effect also remains after the composite has been produced. The sustaining sections 13 are formed from the same slabstock as the tubular cylindrical section 11, but could, of course, also be produced from some other semi-finished product of a compatible material. In the sustaining sections 13 too, an inner foamable layer 15' of a metal foam material is covered by a skin 14' of a solid metal material. Each sustaining section 13 defines by its strut-like arrangement, the inner edge space in the base portion of each joining section 6. Since the foamable material of the layer 15' is present in this inner edge space, this space, too, is foamed in later foaming, meaning that the composite is further stiffened. Apart from the sustaining sections 13 and the advantages involved, the arrangement as shown in FIG. 2a corresponds completely to that as shown in FIG. 1a, so that reference is also made to the comments above as regards the arrangement as shown in FIG. 2b.

Figure 1B:
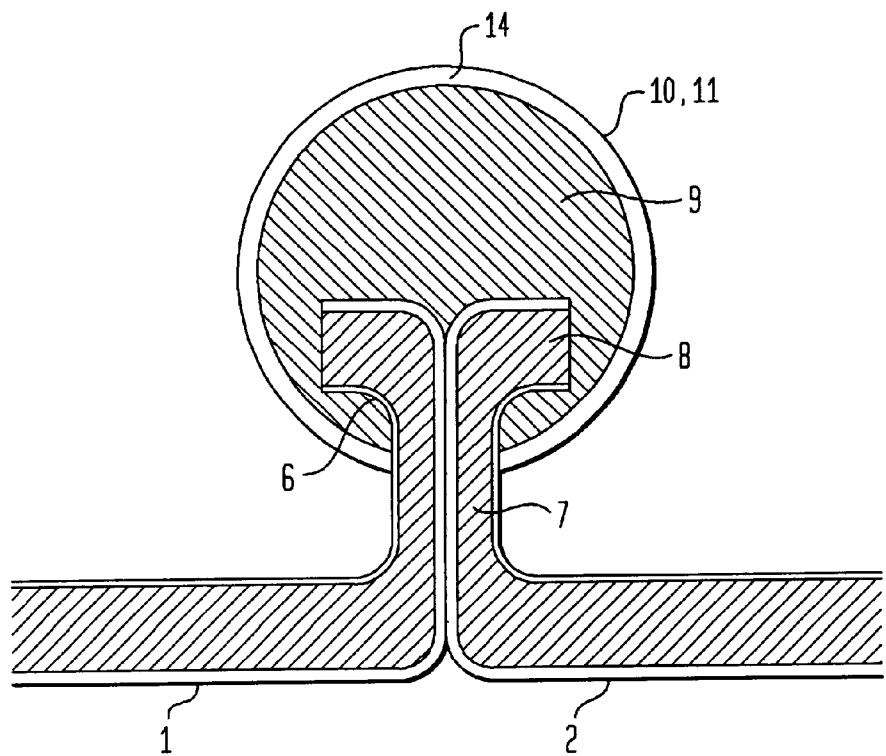
FIG. 1b is a cross-sectional view of the joint, as shown in FIG. 1a, after foaming.
Figure 2B:
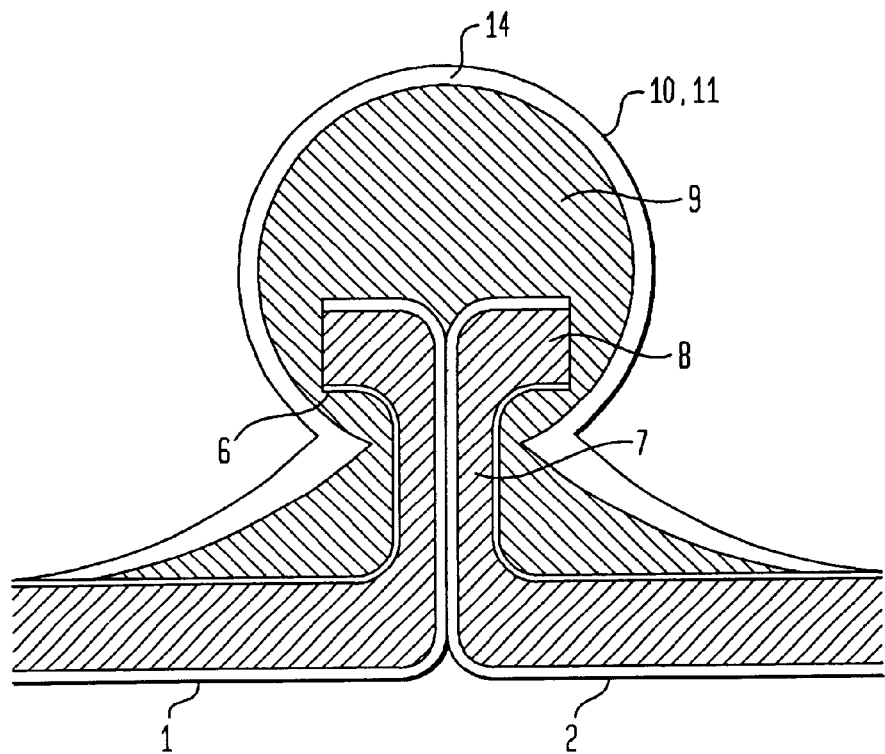
FIG. 2b is a cross-sectional view of the joint, as shown in FIG. 2a, after foaming.

Referring now to FIGS. 1b and 2b, each illustrates the compacted composite of the two preformed bodies in accordance with FIGS. 1a and 2a respectively, resulting from having foamed the metal foam material, and of the jointing clamp 10 for the jointing clamp joints as described above. It is clearly evident that the jointing clamp 10, namely the skin 14 thereof, together with the adjoining portions of the preformed bodies 1 and 2, essentially however the jointing clamp 10 alone, form an encasement for the foaming, and in conclusion foamed, metal foam material in the space 9 as well as in the inner edge portion of the joining section 6 of the second preformed body 2, the foamed and re-cooled metal foam material filling out both spaces uniformly.

In principle, it would be sufficient to configure the joining sections 6 as plain upwards protruding webs 7. In this case too, the two preformed bodies 1 and 2 would be firmly pressed against each other by the abutting faces of their joining sections 6 and thus already become joined. In addition, after foaming, a continuous, homogenous cellular metal structure has materialized in the interior of the encasement extending from the metal foam material of the first preformed body 1 via the metal foam material in the tubular cylindrical section 11 of the jointing clamp 10, forming a bridge, to the metal foam material of the second preformed body 2. Boosting the strength of this composite which thus already forms a combined non-positive and material fusion composite, is further enhanced by the forming of the joining sections 6 which, due to their shape, have an anchoring effect. In the matrix of the foamed metal foam material within the tubular section of the jointing clamp 11, the preformed bodies 1 and 2 are anchored in a mushroomed or barbed arrangement due to the configuration of the second webs 8.

Figure 3A:
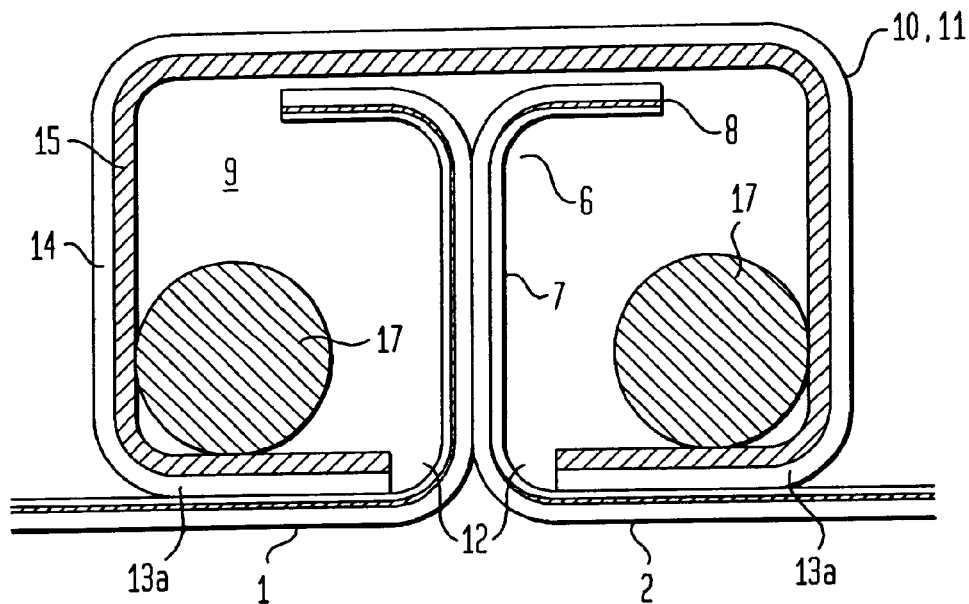
FIG. 3a is a cross-sectional view of two preformed bodies and a rectangular jointing clamp in position for a joint.
Figure 4A:
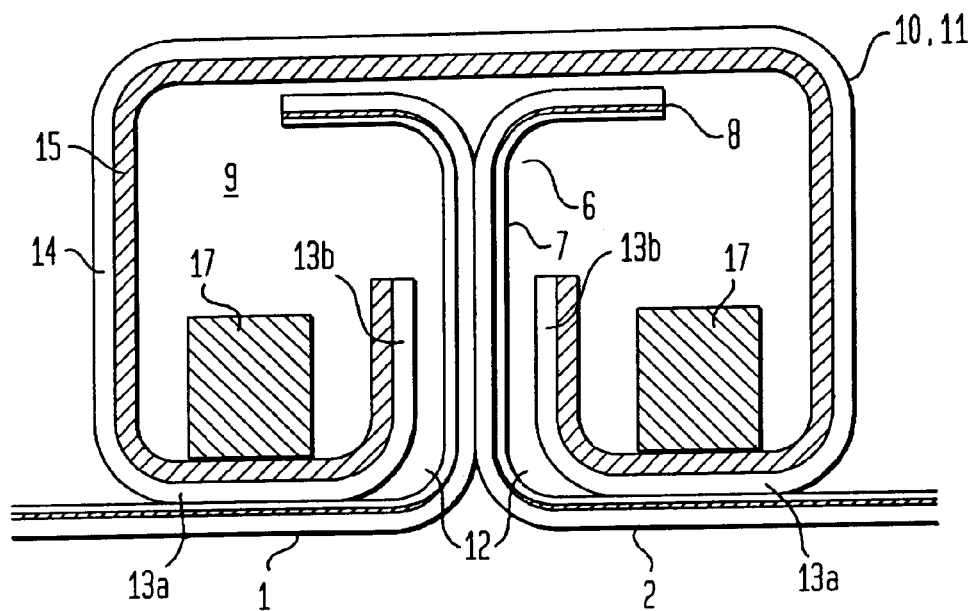
FIG. 4a is a cross-sectional view of two preformed bodies and a rectangular jointing clamp with internal legs in position for a joint.

FIGS. 3a and 4a illustrate the jointing zone of the two preformed bodies 1 and 2, each of which comprises solid metal skins of differing thickness, sandwiching a layer of foamable metal foam material, like the preformed bodies of the example embodiment as shown in FIGS. 1a and 2a. The jointing clamp 10 of the example embodiments, as shown in FIGS. 3a and 4a, is formed by a tubular cylindrical section 11 in a plain rectangular cross-sectional shape with the full-length opening 12. While the jointing clamp 10 of the example embodiment as shown in FIG. 3a ends in two longitudinal legs 13a, facing each other and forming the longitudinal opening 12 between them, in the case of the jointing clamp 10, as shown in FIG. 4a, the two legs 13a are bent into the inner space 9 of the tubular cylindrical section 11 and extend somewhat further parallel to, and spaced away from, the web 7 of the facing joining section 6. In both example embodiments, the jointing clamp 10 with the two rectangular legs 13a, forming between them the longitudinal opening 12 rests on the preformed bodies 1 and 2. The jointing clamp 10 is firmly pressed against the opposing surfaces of the preformed bodies 1 and 2 by its legs during foaming. It is this pressure in conjunction with the opposing force due to the mushroomed shape of the joining section 6 that additionally stiffens the preformed body composite. As evident from FIG. 4a, due to the additional leg 13b, bent inwards, an even stiffer joint of the preformed bodies by the jointing clamp is possible than in the case of the example embodiment as shown in FIG. 3a. If necessary, the preformed bodies 1 and 2 are additionally locked in place externally for the jointing procedure.

Figure 3B:
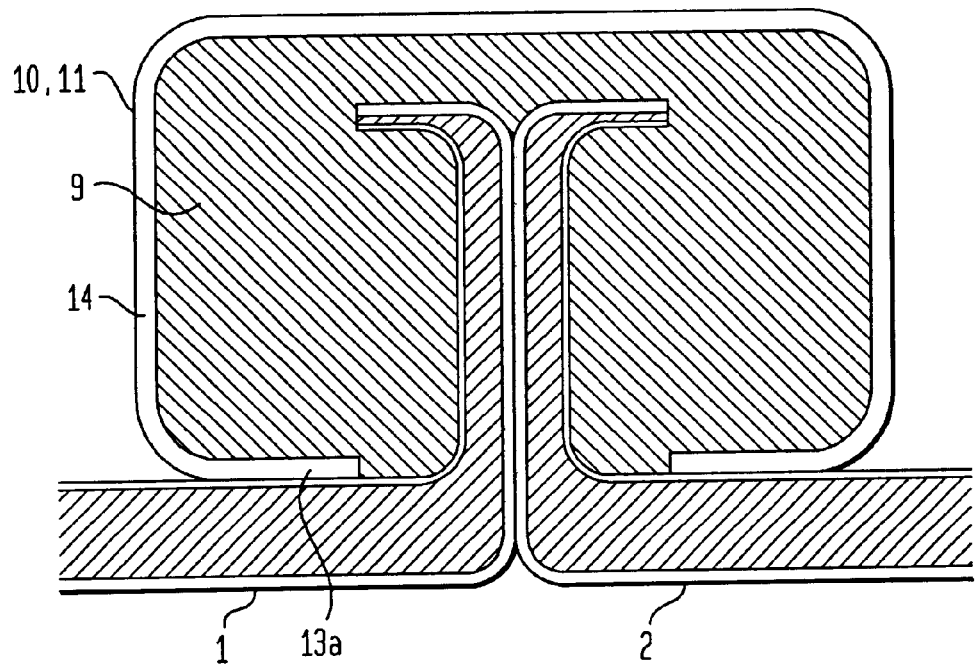
FIG. 3b is a cross-sectional view of the joint, as shown in FIG. 3a, after foaming.
Figure 4B:
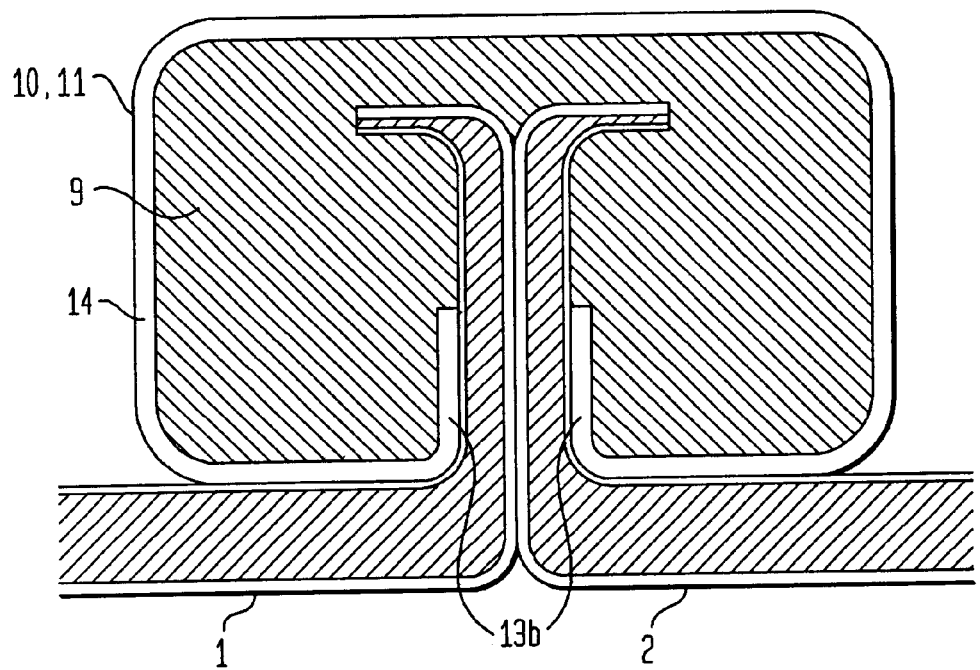
FIG. 4b is a cross-sectional view of the joint, as shown in FIG. 4a, after foaming.

Referring now to FIGS. 3b and 4b, illustrated are the rectangular jointing clamps 10, as described above, after foaming. In this arrangement, the space 9, surrounded by the jointing clamp 10 and the two preformed bodies 1 and 2, is filled out, homogeneously and completely, with the foamed metal foam, thus resulting in a firm connection of the two preformed bodies 1 and 2 by positive and non-positive action similar to that of the example embodiments as described above.

Figure 5A:
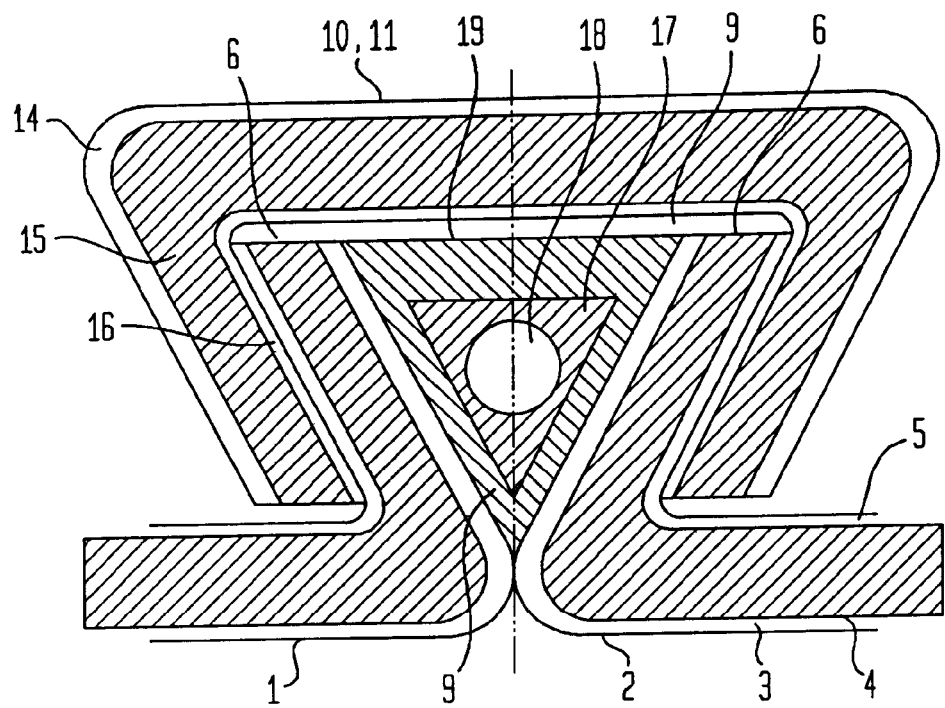
FIG. 5a is a cross-sectional view of two already foamed preformed bodies and a trapezoidal jointing clamp, likewise already foamed, in position for a joint.
Figure 5B:
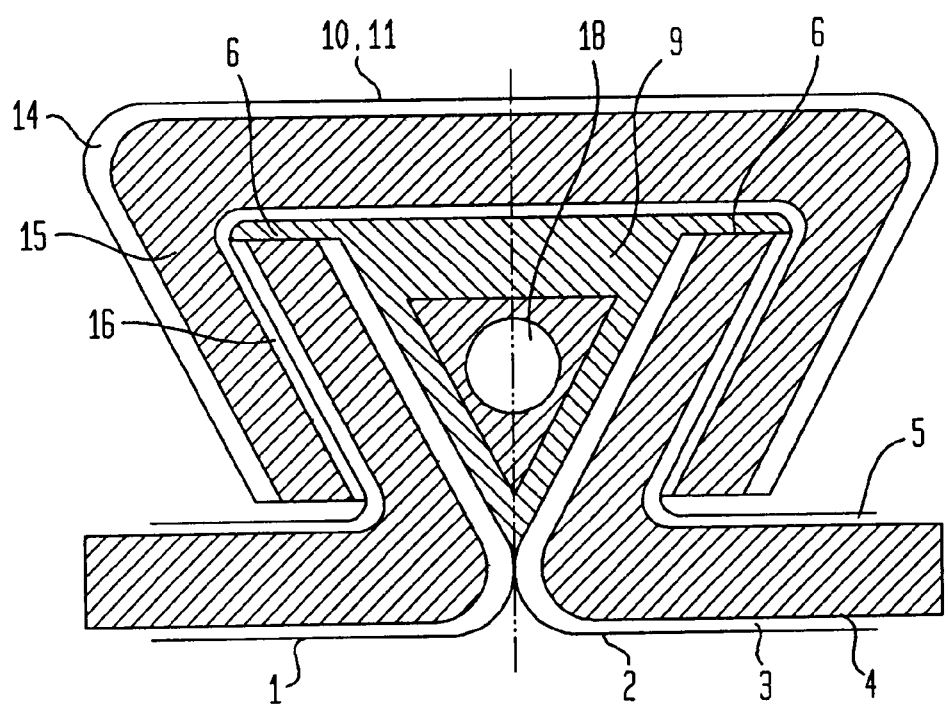
FIG. 5b is a cross-sectional view of the joint, as shown in FIG. 5a, after foaming.

FIGS. 5a and 5b show an example embodiment of a preformed body composite before and after foaming, in which both the preformed bodies 1 and 2 and the jointing clamp 10 are formed by already foamed metal foam preformed bodies. Here again, sections which have been produced from slabstock are involved. The starting material of the sections 1, 2 and 10 is a triple-laminated slabstock in which the inner foamed cellular metal 4 is sandwiched by a solid metal skin 3 and 5. The preformed bodies 1 and 2 and the jointing clamp 10 experience no further change in volume or shape during foaming for the purpose of joining the preformed bodies 1 and 2. The jointing clamp 10 may also be formed initially as a tubular section, before then being foamed out fully or partly by means of inserted supplemental sections, instead of it being formed from slabstock having a foamed layer.

Prior to foaming, the preformed bodies 1 and 2 are held in the desired location for the composite purely positively by the jointing clamp 10. The joining sections 6 of this example embodiment are formed by single folding or bending parallel to a longitudinal edge of each of the preformed bodies 1 and 2. The longitudinal edges of the preformed bodies are bent by more than 90° and thus bent back to the corresponding preformed body, resulting in a v-shaped inner edge portion. To adapt to this pair of joining sections, the jointing clamp 10 comprises a tubular cylindrical section 11, as may be obtained from a rectangular slabstock when two opposing longitudinal edges are bent towards each other. In the cross-section, a tubular triangle shaped section materializes, the triangle being cut off or open at one angle to form a longitudinal opening. Once the jointing clamp 10 has been pushed into place over the joining sections 6 of the preformed bodies 1 and 2, this arrangement has the shape of dovetail joint in the jointing zone.

To locate the preformed bodies 1 and 2 even better in the desired position during foaming, at least one spacer 19 is arranged in the space 9 defined by the jointing clamp 10. In the example embodiment, use is made of several triangular spacers 19, plate-shaped corresponding to the shape of the joining sections 6 or of the jointing clamp 10 seated spaced away from each other in the longitudinal direction of the composite, like wedges between the surface areas of the joining sections 6 facing each other. The result is a positive connection held together by the two legs of the jointing clamp 10, opposing and facing each other and totally defined transversely to the longitudinal direction. The material of the spacers 19 is selected so that their melting temperature is sufficiently above the foaming temperature of the metal foam material to be foamed in producing the composite. The spacers 19 may be made, for example, from the same material as the solid metal skins of the preformed bodies 1 and 2 or of the jointing clamp 10. Existing as the foamable metal foam material in the space defined by such an encasement is merely the material of the supplemental sections 17. The spacers may be formed of wire or sheet metal. In the example embodiment sheet metal material is used, for example, structured sheet metal plates as evident from FIGS. 9a to 9c.

Internal thermal treatment of the encased space 9 is achieved by means of a thermal treatment means 18 arranged in the space 9. The thermal treatment means 18 is formed by a full-length flow conduit through which, on the one hand, a heating fluid for this purpose of heating during foaming or, on the other, a coolant fluid for this purpose of cooling at the end of foaming and also thereafter is directed. Should both heating and later cooling be wanted, it may be expedient to provide for this purpose a separate flow conduit like that of the conduit 18.

In addition, the conduit 18, or also a separate conduit of its own, may be used for introducing an inert gas or reaction gas with which the metal foam material is charged during foaming to diminish or enhance the oxidative effects of a foaming gas contained therein. Such an antioxidant or oxidant agent may simultaneously also form a heating and/or coolant fluid. So that the inert gas or reaction gas comes into contact with the metal foam to react therewith, a conduit is provided with small openings, i.e. perforated for this purpose.

By controlling heating and cooling of the inserted foamable supplemental sections 17 via a thermal treatment fluid flowing through the flow or thermal treatment conduit 18 it is reliably assured in particular that the sections 1, 2 and 10 already foamed prior to the jointing procedure are not effected by the jointing foams, e.g. by undesirable initiation of a refoaming of the sections 1, 2 and 10. The conduit 18 may be formed of a tube of any cross-sectional shape, the tube being made of a material having a sufficiently higher melting temperature than the temperature of the thermal treatment fluid required for foaming.

The supplemental sections 17 are provided with a drilled hole, having the same shape and size as that of the tube cross-section. The supplemental sections 17 may thus be skewered onto the conduit 18, alternating with the spacers 19, and introduced into the cavity 9. The spacers 19 are formed to maintain the conduit 18 with the skewered supplemental sections 17 centered in the cavity. The spacers 19 form simultaneously, radially protruding cooling fins and/or heating fins of the thermal treatment conduit 18, serving more particularly for heating the supplemental sections 17. After foaming, they are made use of to provide accelerated and defined cooling of the foam phase in the space 9, due to their significantly higher heat conductivity as compared to that of the metal foam. Several thermal treatment conduits 18, at least one conduit for each of the cited purposes or also several for each of the cited purposes, may be disposed in the space 9.

The foamable metal foam material is arranged directly surrounding the conduit 18, thus making it possible to integrate thermal treatment means and metal foam material in a single operation in the jointing zone. In this arrangement, it is also possible to drill commercially available, extruded sections of unfoamed metal foam material for skewering onto the thermal treatment conduit 18. The supplemental sections 17 should be firmly seated on the thermal treatment conduit to ensure a good heat transfer. If spacers 19 are disposed along the thermal treatment conduit 18, each of the individual supplemental sections 17 may be skewered between such spacers 19. A thermal treatment conduit 18 may be formed by a single piece of tube on which the spacers 19 are mounted and thus preferably connected for good heat conductivity. Here, supplemental sections 17 are skewered between each of which spacers 19. However, such a thermal treatment conduit 18 may also be pieced together sectionwise, for example by pressing conduit lengths abutting each other into one socket each.

A thermal treatment conduit or several thermal treatment conduits and spacers, as described above, may also be provided in the cavities of the jointing clamp 10 of the example embodiments as shown in FIGS. 1a to 4b.

Referring now to FIG. 5b, there is illustrated the preformed body composite after foaming. The foamable metal foam material of the supplemental sections 17—or of the several supplemental sections 17 when several such sections 17 are skewered along the thermal treatment conduit 18—then fills out the space 9 and thus produces the non-releasable, high-strength compacted composite between the preformed bodies 1 and 2 and the jointing clamp 10. The forces resulting from foaming are distributed over the contact surface area between the preformed bodies 1 and 2 and the jointing clamp 10, like a wedge force oriented tangentially and normal to the joining sections 6 to thereby press the joining sections 6 against the inner walls of the jointing clamp 10.

Due to the integration of a thermal treatment means, this being conduit 18 in the example embodiment, replacing a damaged preformed body or a damaged portion of a preformed body is possible in a simple way, since with the aid of the conduit 18 only a local heating is achievable in the jointing zone of the replacement preformed body. When, for example, the damaged portion of a preformed body is replaced by a replacement preformed body, the damaged portion of the preformed body is machined out of the composite, the conduit 18 being likewise parted at parting points of the preformed body formed thereby. The conduit lengths in the remaining preformed body composite are then connected to a cooling apparatus. The conduit length in the portion of the machined-out preformed body portion is connected to a heater and used as the thermal treatment conduit in joint-foaming the replacement preformed body. As an alternative, a new thermal treatment conduit may also be incorporated in the jointing zone for the replacement preformed body. For joint-foaming, a heating fluid is directed from the heater to the thermal treatment conduit for the replacement preformed body and, after having passed through, is returned to the heater. In this way, the thermal treatment conduit for the replacement preformed body forms a connector in the circulation of a heating fluid. To protect against excessive heat input, the remaining thermal treatment conduits 18 of the preformed body portions, adjoining the replacement preformed body, serve as connecting conduits in a cooling circuit so that, during repair work, the temperature of the metal foam material is controlled in the jointing zone of the replacement preformed body and adjoining thereto.

Figure 6A:
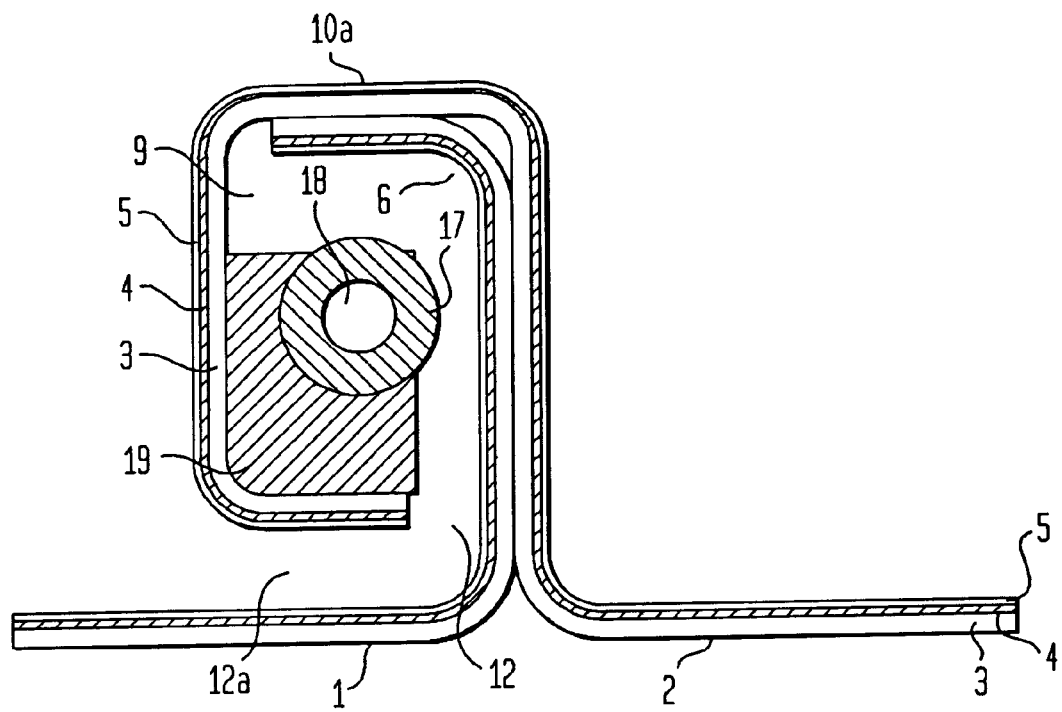
FIG. 6a is a cross-sectional view of two preformed bodies with an integrated jointing clamp in position for a joint.
Figure 6B:
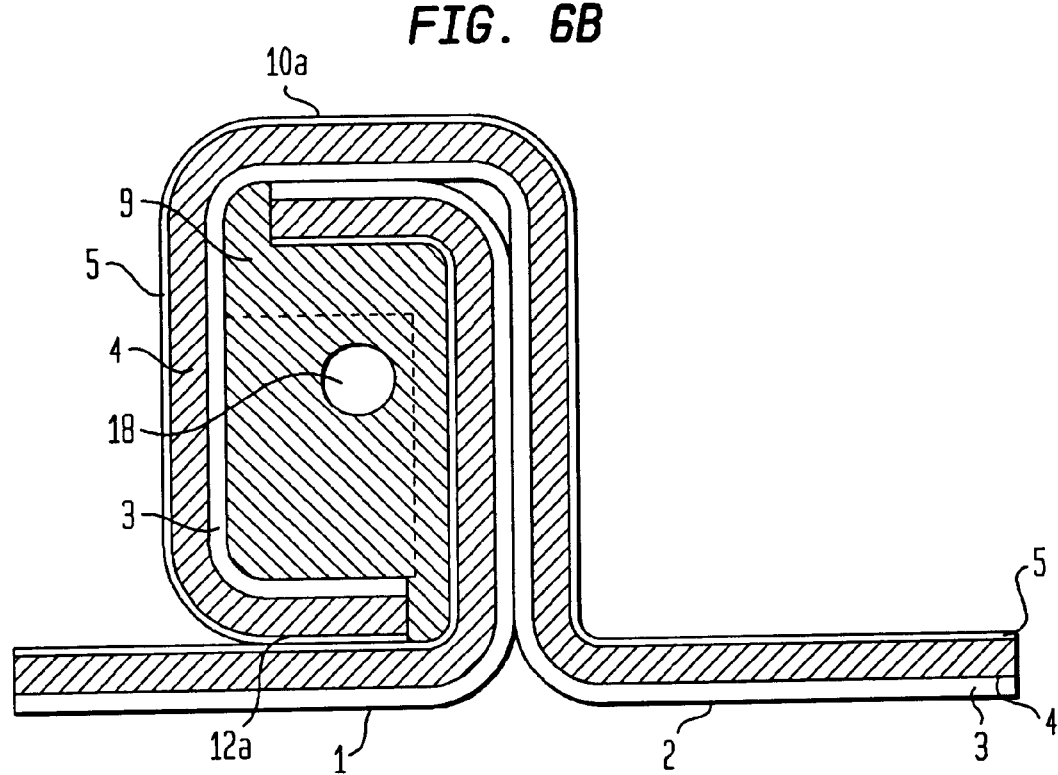
FIG. 6b is a cross-sectional view of the joint, as shown in FIG. 6a, after foaming.

FIGS. 6a and 6b illustrate a preformed body composite, before and after foaming, in which the preformed bodies 1 and 2 themselves form a jointing clamp 10a, i.e. no separate jointing clamp is required. The preformed bodies 1 and 2 are fabricated from foamable slabstock 4, having a bottom and top solid metal skin 3 and 5. The skin 5, to the surface area of which the material of the foamable layer 4 is to expand during foaming, ideally in the direction of the normals of the surface area, is thinner and thus more flexible than the opposing skin 3. The thicker skin 3 is designed sufficiently stable so that the flanged shape of the preformed body edges, i.e. the shape of the joining sections, is retained during foaming. Where necessary, the preformed bodies 1 and 2 are additionally externally fixed to each other during foaming.

The preformed bodies 1 and 2 are shaped at the composite location or in the jointing zone so that between them a positive, non-positive and material fusing connection materializes. In the example embodiment as shown in FIG. 6a, this is assured by the hook-shaped flanging of the preformed bodies 1 and 2. The joining section 6 of the preformed body 1 is bent again into a hook, twice by 90°. The joining section 6 of the second preformed body 2 clasps this hook, it being bent or folded such that a tubular jointing clamp 10a is formed, comprising an opening 12 for introducing the joining section 6 of the preformed body 1. In its jointing zone, and directly adjoining thereto, the second preformed body 2 exhibits the shape of a "question mark". The preformed bodies 1 and 2 can thus be interhooked.

Inserted in the space 9 encased by the preformed bodies 1 and 2 are foamable supplemental sections 17 to ensure that the space 9 is totally foamed out. The supplemental sections 17 are skewered on a thermal treatment conduit 18, and are held in place by spacers 19.

Referring now to FIG. 6b, illustrated is the joint after foaming. During foaming, an expansion in the volume of the preformed bodies 1 and 2 has taken place, preferably perpendicular to the thinner skin 5. As a result of this, the two preformed bodies 1 and 2 are expanded towards each other at a gap 12a, open before foaming, between two facing skins 5, and thus closing this gap 12a. The foamed supplemental section 17 has completely filled out the closed space 9, and pressed the preformed bodies against each other.

Figure 6C:
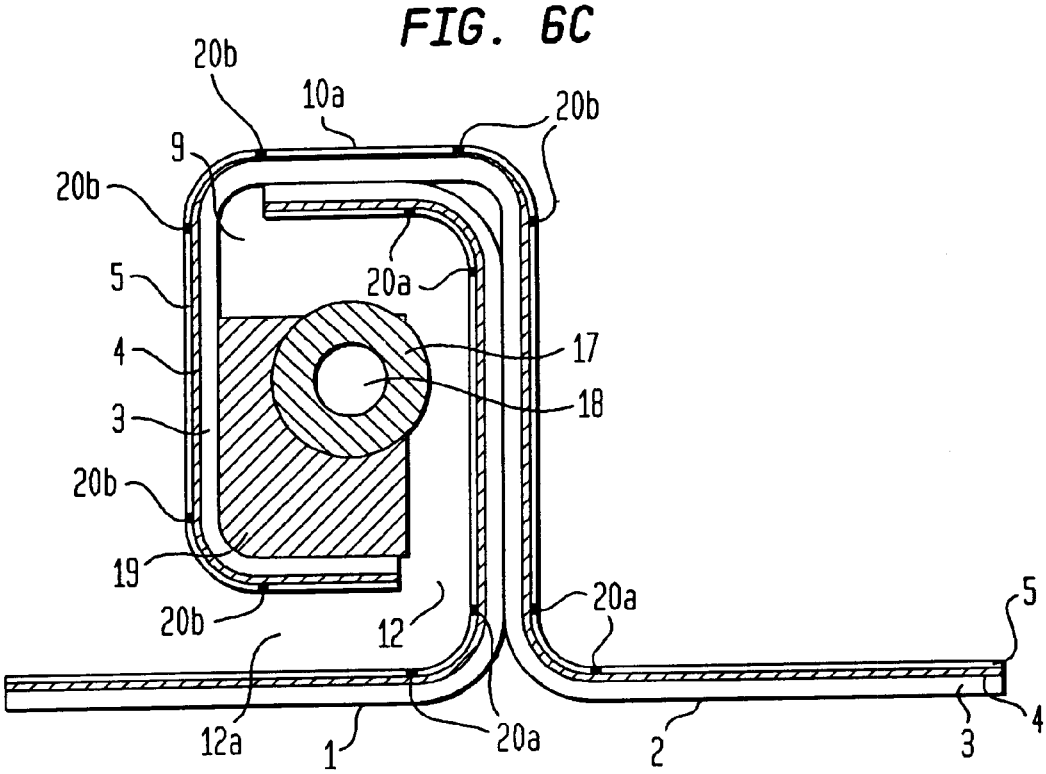
FIG. 6c is a cross-sectional view of the joint, as shown in FIG. 6a, but with slotted skin plates of the preformed bodies.
Figure 6D:
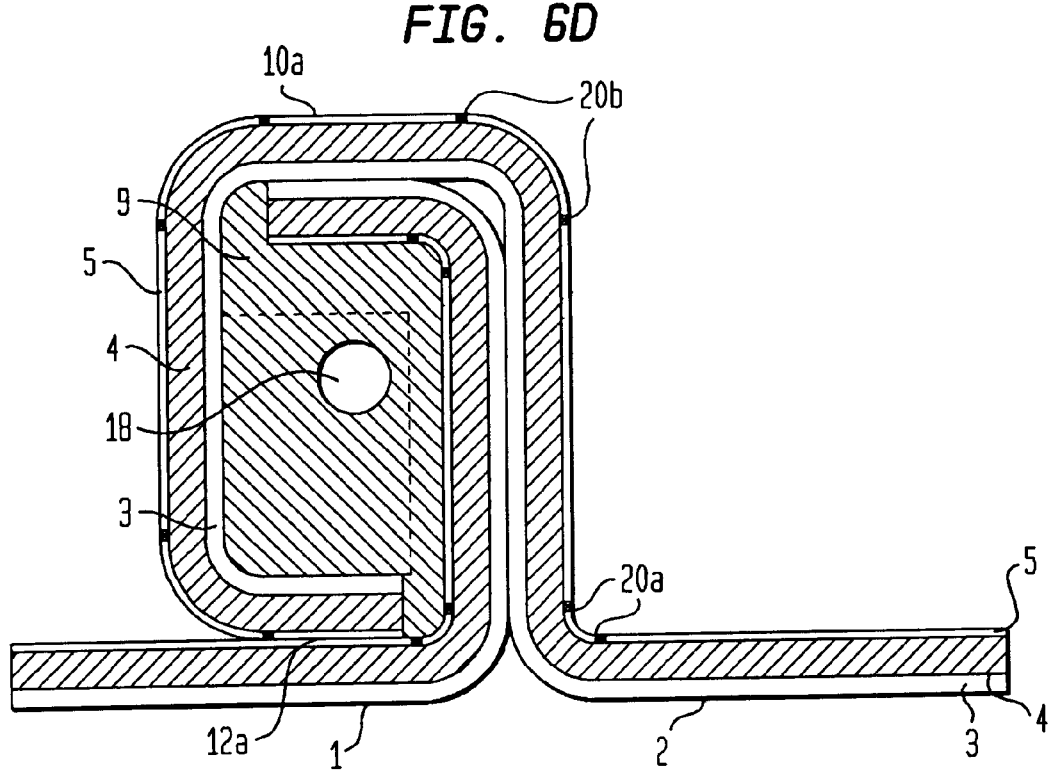
FIG. 6d is a cross-sectional view of the joint, as shown in FIG. 6c, after foaming.

FIGS. 6c and 6d illustrate the joint as described with reference to FIGS. 6a and 6b, but with the difference that the skin sheet metal of the preformed bodies 1 and 2, forming the thinner skin 5, is now provided with compression joints 20a and expansion joints 20b to better ensure unobstructed foaming. This may prove necessary, when the thinner skins 5 are not flexible enough to ensure unobstructed foaming, for example, due to their thickness. To configure the compression joints and expansion joints 20a and 20b, the skins 5 are each provided with full-length slots in the fold or bend at the start and end of each radius. The width of the slots is adapted to the anticipated extent and direction of foaming, so that the strips of solid material adjoining joints 20a and 20b are not an obstacle during foaming. It is for this reason that the compression joints 20a are selected wider than the expansion joints 20b, since it is here that the skins 5—as viewed in the direction of the free end of the corresponding preformed body—move in the direction of the start of the radius and thus a larger clearance is of advantage.

Except for the way in which the joints 20a and 20b react, the comments made with reference to FIG. 6b apply as regards FIG. 6d. Due to foaming, the width of the compression joints 20a has become less since the individual sheet metal strips have moved in the direction of the start of the radius. The width of the expansion joints 20b has become greater since the strips of sheet metal have moved outwards to the free ends.

Figure 7A:
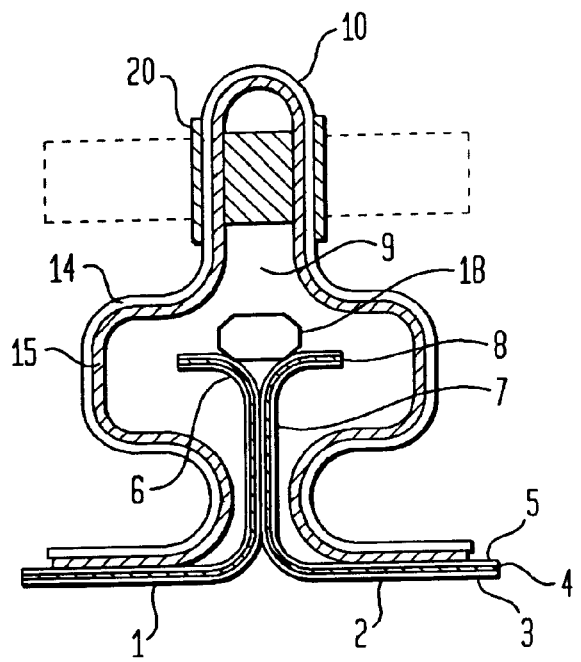
FIG. 7a is a cross-sectional view of two preformed bodies and a jointing clamp, including a mounting or load suspension sleeve, in position for a joint.
Figure 7B:
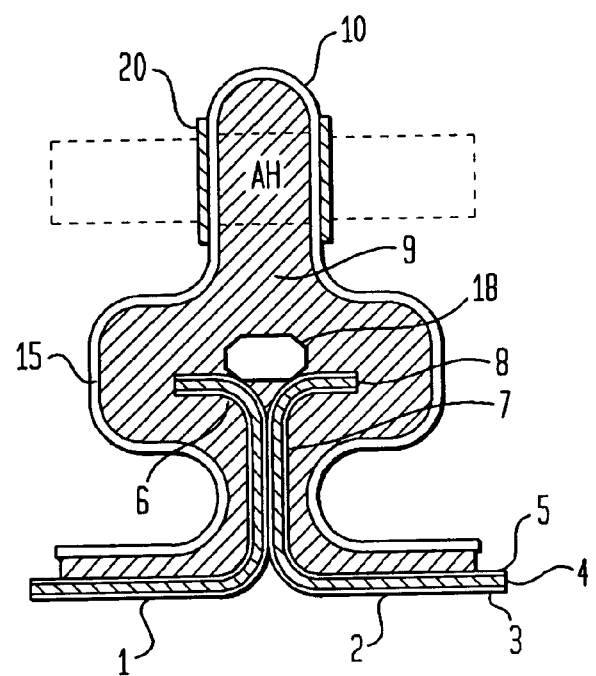
FIG. 7b is a cross-sectional view of the joint, as shown in FIG. 7a, after foaming.

Referring now to FIGS. 7a and 7b, illustrated is a joint of two preformed bodies 1 and 2, including an inserted mounting or load supporting means 20. Just like in the example embodiments described above, each of the preformed bodies 1 and 2 consists of a top and bottom solid metal skin 3 and 5 and a sandwiched foamable layer 4. Similar to the arrangement as shown in FIGS. 1a–4b, a joining section 6 is formed at each of the preformed bodies 1 and 2 to obtain a particularly reliable compacted composite. The jointing clamp 10 is configured of a solid metal skin 14 and a foamable layer 15, and formed so that the mounting means—this being a sleeve 20 in the example embodiment—may be incorporated transversely to the longitudinal axis of the jointing clamp 10. The sleeve 20 may be configured split, the two halves being screwed or clamped to each other. For this purpose, rivet pins or similar fasteners may be used. If so, care must be taken that the sleeve 20 is made of a material having no negative effects on the jointing clamp 10, e.g. due to contact corrosion with the jointing clamp material. For incorporating the sleeve 20, the jointing clamp 10 is provided full-length with a hole, the shape and size of which corresponds to the outer diameter of the sleeve 20, and runs transversely to the longitudinal axis of the jointing clamp. This hole may be produced by conventional techniques, e.g. by drilling or stamping.

FIG. 7b illustrates the joint after foaming. The cavity 9 is totally filled with foam material, the sleeve 20, additionally included, being totally embedded in foaming and thus firmly locked to the jointing clamp, both positively and non-positively. Another possibility would be to leave an opening free during foaming by means of a pin, made of a material having a higher melting temperature than the temperature needed for foaming, and has the property of not entering into a material fusing connection with the foam material. When foaming has ended completely, the pin is then removed to thus obtain a fastener opening. In this case, the foamable metal foam material would foamingly surround the inserted pin and, after cooling and removal of the pin, leaves an opening, having a closed surface.

The thermal treatment conduit 18 serves to accelerate cooling of the metal foam after foaming, the coolant fluid being guided through the thermal treatment conduit 18. Where necessary, the joint may be additionally cooled from outside by suitable media, e.g. a stream of cold air.

Figure 8:
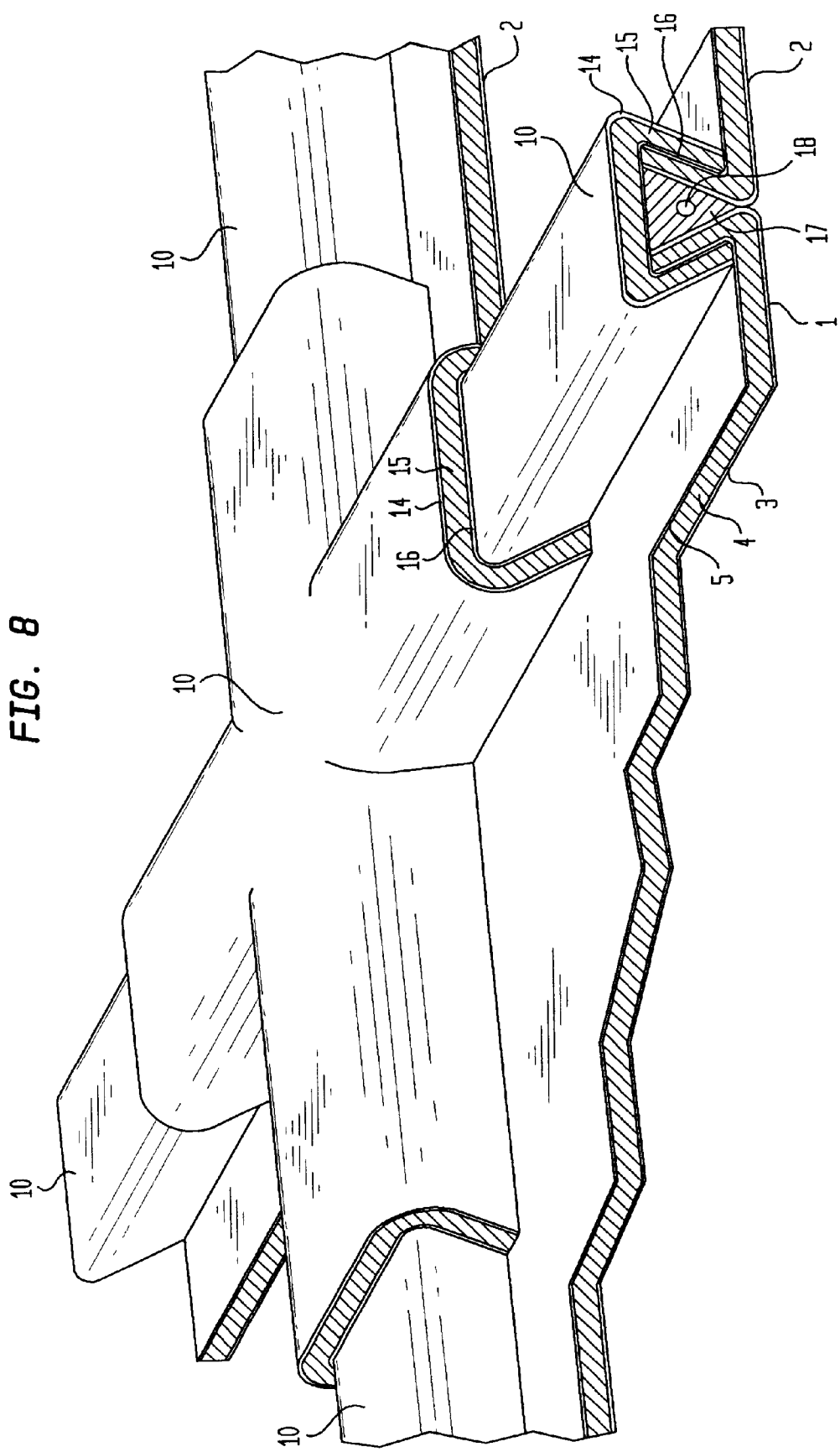
FIG. 8 is a cross-sectional view of a cross-type composite

Referring now to FIG. 8, there is illustrated a cross-type composite of four preformed bodies 1 and 2, the joint, as shown in FIGS. 5a and 5b, being incorporated between each two pairs of adjoining preformed bodies 1 and 2. Use is made of the jointing clamp 10, as described with reference to the FIGS. 5a and 5b, in producing each of these joints, reference accordingly being made to the description of this example embodiment in discussing the paired jointing of preformed bodies 1 and 2.

Evident from FIG. 8, are four composite preformed bodies 1, 2, 10 oriented in a common intersection, facing each other perpendicularly in the longitudinal direction of their jointing zones, and located in this relative position as desired for the cross-type composite as shown.

A cross-type jointing clamp 10 has the function of a cap clamp. The cap clamp 10 is configured in one piece, with four clamp legs standing perpendicular to each other, protruding from a clamp center portion. The cap clamp may also be composed of several jointing clamps, as shown in FIGS. 5a and 5b, for example, welded to each other. Each of the legs of the cap clamp 10 has, cross-sectionally, the shape of the jointing clamp 10 of the example embodiment of FIGS.

5a and 5b. The cap clamp 10 is three-layer, with solid metal outer skins 14 and 16 sandwiching an inner layer 15 of a foamable metal foam material. The skins 14 and 16 and the sandwiched layer 15 of the cap clamp 10 consist of the same materials as the skins 14 and 16 and the foam material layers 15 of the further jointing clamps 10 for paired joints of preformed bodies 1 and 2.

The cap clamp 10 could also be configured two-layer, comprising only an outer solid metal skin and a foam layer of, the kind used for the jointing clamps of FIGS. 1a to 4b. The foamable metal foam material 15, in this case, of the cap clamp 10 is formed of the same material as the supplemental sections 17, although it would also be possible in configuring the layer 15 as a foamable layer 15 to use a material having a lower foaming temperature, which may be of advantage when the paired joints have already been foamed prior to foaming of the cap clamp 10. Should the layer 15 be a foam layer it is, however, also advantageously possible, due to the thermal treatment conduits 18, to cool the jointing zones of the paired joints up into the zone of the cap clamp 10, when foaming the cap clamp 10, to prevent a repeat foaming. All this requires is connecting the thermal treatment conduits 18 at their open face ends, to a cooling means for passage of a coolant fluid.

FIG. 8 shows the cross-type composite after joint-foaming. Before foaming, the preformed bodies 1 and 2 are placed together, the jointing clamps 10 fitted thereover in the jointing zones and mounted lengthwise, and the thermal treatment conduits 18 inserted with the skewered supplemental sections 17. The supplemental sections 17 are made of the same metal foam material as that of layer 15 of the cap clamp 10. Subsequently, the preformed bodies 1, 2, already clamped as such, are then located in the position shown in FIG. 8, the cap clamp 10 being pressed into place to clasp the four jointing clamps 10. As an alternative to the procedure just described, the four preformed bodies 1, 2 may also be oriented and fixed relative to each other in the position desired for the cross-type composite, and the cap clamp 10 be mounted directly on the preformed bodies 1 and 2. In this type of joint configuration, the jointing clamps 10 for joining two respective preformed bodies 1 and 2 adjoining each other are longitudinally mounted on the joining sections of the preformed bodies 1 and 2 and inserted into the cap clamp 10, it being pushed into the cap clamp 10 as a press-fit, where necessary. Subsequently, the cross-type composite, held together positively, is placed in an oven and heated to the foaming temperature of the metal foam material. By foaming, the secure composite between the individual pairs of preformed bodies 1 and 2, and between the cap clamp 10 and the jointing clamps 10 at the intersection, is produced in a single foaming step.

Should the composite of the preformed bodies 1, 2 exceed the size of the oven or of a conventional oven, the at least one thermal treatment conduit 18 also makes it possible to implement foaming, solely by internal thermal treatment, namely internally heating each of the jointing zones of the preformed bodies 1 and 2 by at least one thermal treatment conduit 18 passing through each of the jointing zones of the adjoining preformed bodies 1 and 2. Should the cap clamp 10 involved be a clamp with foamable metal foam material, one or more thermal treatment conduits may also be arranged in an intermediate zone between the four jointing clamps 10 and the cap clamp 10 seated thereon. Internal thermal treatment may be the only possibility of heating in foaming the metal foam material in the jointing zone.

Figure 9A:
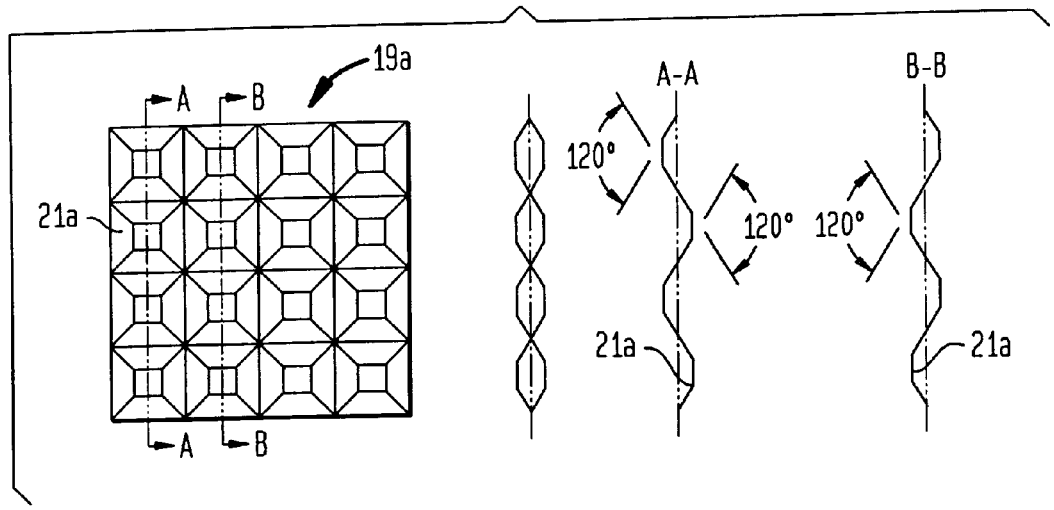
FIGS. 9a–d are illustrations of spacers, with FIGS. 9a–9c each showing a plan view, a side view, and cross-sectional views along the lines A—A and B—B, and FIG. 9d showing a plan view and a side view (i.e., the side view rotated 90° relative to the plan view)
Figure 9B:
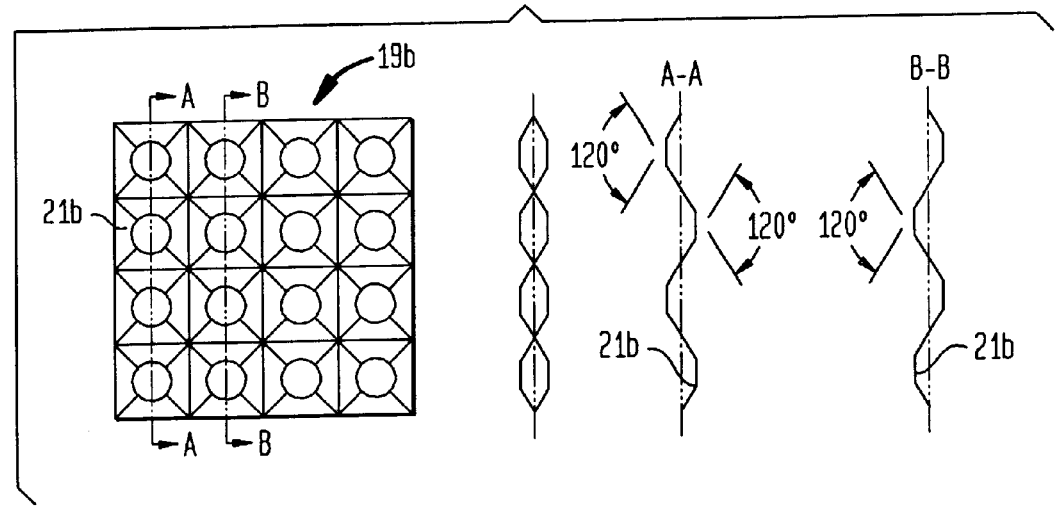
Figure 9C:
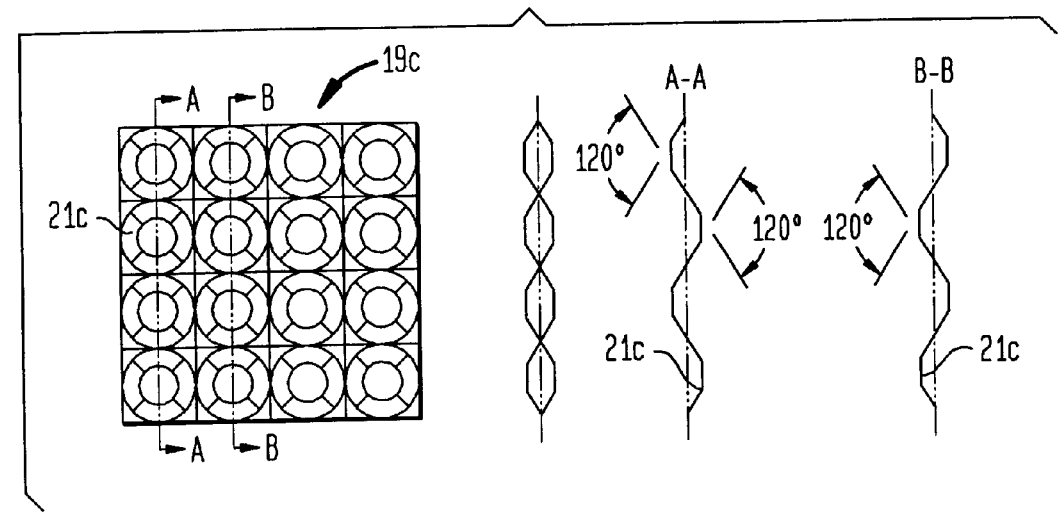

Referring now to FIGS. 9a, 9b, 9c, there are illustrated structured sheet metal plates 19a, 19b and 19c, from which the spacers 19 as used in the previous example embodiments may be fabricated, for instance by means of a parting technique. The sheet metal plates 19a, 19b and 19c are made of a metal having a melting temperature sufficiently higher than the temperature needed for foaming. For structuring the surface, these sheet metal plates 19a, 19b and 19c are provided as flat semi-finished products with a uniform arrangement of bulges or pockets 21a, 21b and 21c, by means of a suitable tool. Preferably, structuring is done by means of embossing in an embossing mold.

The pockets 21a, 21b and 21c are regular polyhedrons, cones or truncated cones. Each of the defining side surface areas of the pockets run towards each other at an angle of 120° to the base of each pocket. At their base, the pockets 21a, 21b and 21c are truncated flat, and may be open or closed at the base. It is through such an open base of a pocket that a thermal treatment conduit may be passed through.

The pockets of each of the sheet metal plates 19a, 19b and 19c are arranged densely packed, adjoining each other in rows, each running parallel in two directions perpendicular to each other. In each row, each pocket tapered towards its base in a direction normal to the surface of the sheet metal plate prior to structuring is bordered by pockets, which are tapered to their base in the opposite normal direction, i.e. the pockets alternate as regards their direction of tapering in each row and in the row perpendicular thereto in each case. This is evident from the side view and the cross-sectional views taken along the lines A—A and B—B as shown in each FIGS. 9a, 9b and 9c.

Figure 9D:
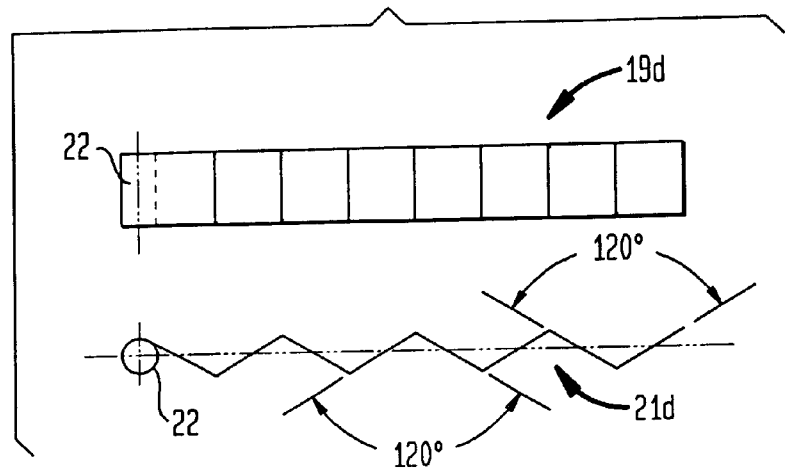

The volume of each single pocket amounts to half the size of an expected average foam bubble of the material to be foamed in joint-foaming, volume in this sense being understood as the space enclosed by the defining side surface areas of each pocket and the covering surface areas, joining the edges of the side surface areas imagined flat. Referring now to FIG. 9d, there is illustrated a spacer 19d, formed from a strip of sheet metal, bent zigzagged, the sheet metal sections of each zigzag being angled 120° to the other. The zigzags form open pockets 21d transversely to the strip of sheet metal. The spacer 19d is bent at one end so that it may be secured to a thermal treatment conduit 18 in a clamp-fit. For this purpose, the start of the sheet metal plate is bent into a circular sleeve 22, having an inner diameter which is slightly less than an outer diameter of the thermal treatment conduit. In order to mount the spacer 19d onto the thermal treatment conduit, the sleeve 22 is flared by a corresponding amount in the elastic portion, and then mounted in the desired position to thus form a clamp-fit on the thermal treatment conduit. The retaining sleeve 22 may also be configured between the ends of the strip of solid metal, especially in the middle, to obtain a spacer equal on two sides.

Figure 10:
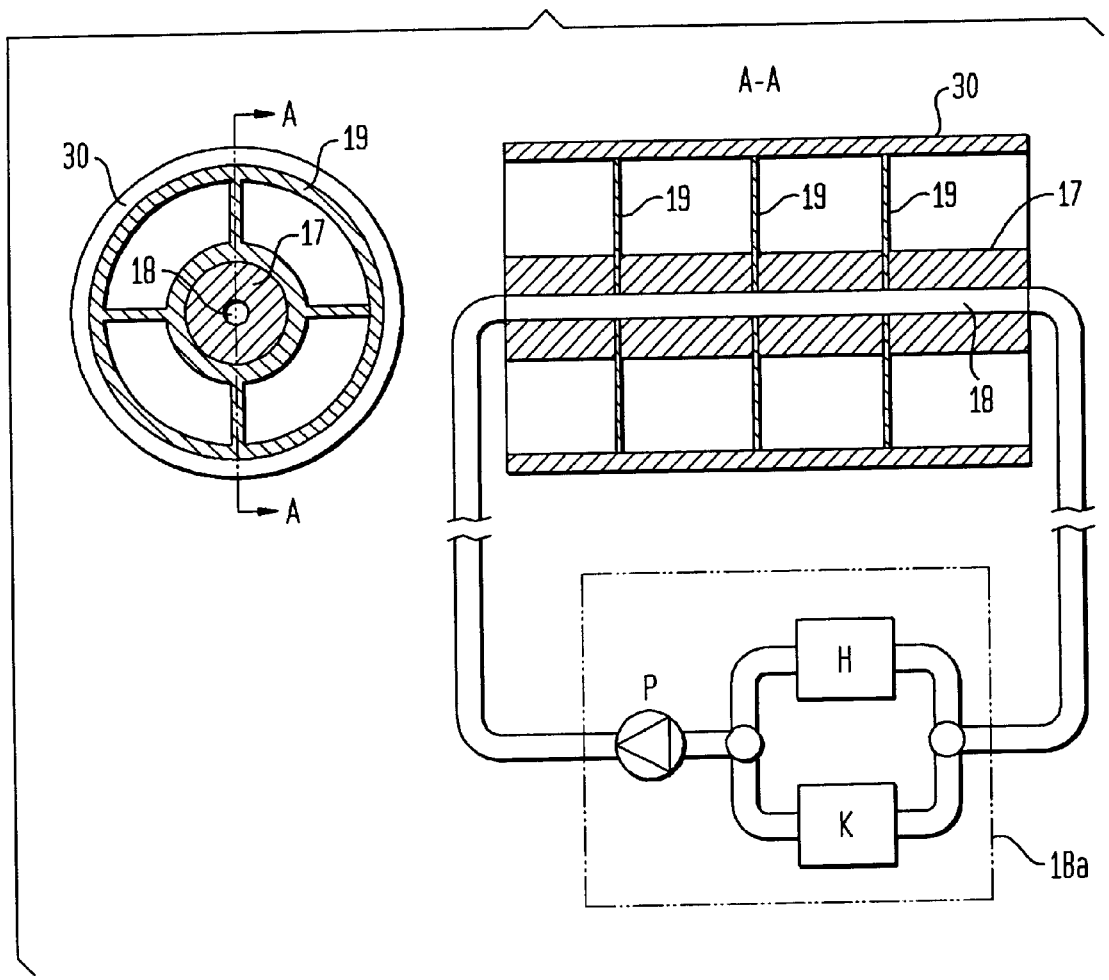
FIG. 10 is a cross-sectional view of a tubular section, including a cross-sectional view along the line A—A also depicting thermal treatment conduit and supplemental sections.

FIG. 10 represents a cross-sectional view and a longitudinal section view, taken along the line A—A, of a tubular cylindrical section 30, prepared for being foamed out. The tubular cylindrical section 30 is formed by a plain circular tube, having a single-layer tubular shell of a metallic material. To boost its buckling strength and flexural rigidity, the tubular cylindrical section 30 is foamed out with a metal foam material. FIG. 10 shows the tubular cylindrical section 30 immediately prior to being foamed out. For this purpose, a thermal treatment conduit 18, in the form of a tube which is thin compared to the tubular cylindrical section 30, is inserted centrally into the tubular cylindrical section 30. The thermal treatment conduit 18 is held in place concentrically to the tubular cylindrical section 30 by means of spacers 19, protruding radially therefrom, it passing through the tubular cylindrical section 30 in this position.

The spacers 19 are formed by spacer rings arranged along the thermal treatment conduit 18 at regular spaces, and maintain the thermal treatment conduit 18 in position concentric to the tubular cylindrical section 30. Skewered onto the thermal treatment conduit 18 between the spacers 19 are supplemental sections 17 of a foamable metal foam material. The spacers 19 are connected to the thermal treatment conduit 18 for good heat conduction so that they act as thermal treatment surface areas in addition to those of the tubular shell of the thermal treatment conduit 18.

The spacers 19 of FIG. 10 are each formed by two flat, thin, narrow, concentrically annular disks, having radial connecting webs. Instead, structured sheet metal plates fabricated from the spacer sheet metal plates of FIGS. 9a to 9c could be used, through which the flow conduit 18 is centrally guided, and the outer circumferential edge of which is adapted to the internal cross-section of the tubular cylindrical section 30. The sheet metal strips 19d of FIG. 9d could, likewise, be used as spacers 19 by mounting them along the thermal treatment conduit 18 in a number sufficient to position the flow conduit 18 as desired.

At its open face ends, the thermal treatment conduit 18 is connected to a thermal treatment means 18a. The thermal treatment means 18a essentially consists of a heater H and a cooler K, arranged parallel thereto in the thermal treatment circuit, as well as a pump P. The thermal treatment fluid is pumped in the closed thermal treatment circuit by the pump P via a corresponding conduit to the thermal treatment conduit 18, through the thermal treatment conduit 18, and via a corresponding pipe to the heater H or cooler K. By means of valving, circuiting is made optionally via the heater H or the cooler K. In this way, external heating, acting on the tubular cylindrical section 30 during foaming, is supported by an internal heating. For controlled termination of foaming, the thermal treatment means 18a switches over from heating to cooling so that the interior of the tubular cylindrical section 30 at this point in time is actively cooled from within. Due to internal heating during foaming, the thermal energy to be introduced from outside may be reduced as compared to a foamed tubular cylindrical section 30 having no internal heating. It is of advantage, in addition, that it is precisely the foaming zone in the interior of the tubular cylindrical section 30 that is locally heated—which by means of a heat entry from outside has been lastly brought to the temperature needed for foaming, due to the insulating effect of the frothed foam material—that is now directly heated from within. This enables a more homogenous cell structure of the frothed foam material to be achieved in the interior of the tubular cylindrical section 30.

Referring now to FIGS. 11a and 11b, illustrated in cross-section is a horse-shoe shaped tubular section 30a of aluminum for a mast of a sailing boat. The inner space 31, obtained by the horse-shoe shape. of the tubular section 30a, serves to accommodate the sail when furled. The tubular section 30a comprises a cavity 9, surrounded on all sides. To stiffen the tubular section 30a, the cavity 9 is foamed out with a metal foam material.

In a portion on one side of the longitudinal centerline C—C, the tubular section 30a is illustrated immediately prior to foaming, and in a portion on the other side of the longitudinal centerline C—C, after foaming.

The tubular section 30a is cold formed into a horse-shoe shape from slabstock, this simultaneously forming also the enclosed cavity 9. The slabstock is a laminated composite material, obtained for example by extrusion, more particularly by means of hydrostatic extrusion, it consisting of a solid metal skin 3 and a layer 4 of a foamable metal foam material metallurgically compatible with the skin material. After the tubular section 3 has been formed, the skin 3 encases the foamable layer 4, which is then on the inside. After forming, the abutting ends of the slabstock may be advantageously firmly joined to each other by means of the joint as described above, although this does not exclude other joints, for example a welded joint.

In the next step, thermal treatment conduits 18, configured as tubes, are inserted in the elongated horse-shoe shaped cavity 9. Several of the spacers 19d, shown in FIG. 9d, are each clamped to the thermal treatment conduits 18. Some of the spacers 19d are provided at both ends with clamping sleeves 22 and clamped simultaneously to adjoining pairs of thermal treatment conduits 18. The result is a continuous thermal treatment assembly which, due to its flexibility, is adaptable to any cavity shape. The spacers 19d maintain the thermal treatment conduits 18 in the desired positions in the cavity 9. The supplemental sections 17, alternating with spacers 19d, are mounted on the thermal treatment conduits 18 in the "skewer" technique as described above in the previous example embodiments.

For foaming, the tubular section 30 is placed into an oven. The thermal treatment conduits 18 serve to pass coolant fluid in order for controlled termination of foaming. In supporting the heat input from outside, heat may also be introduced from within the foam material by means of the conduits 18 to permit a more homogenous foaming, or also merely for an accelerated foaming. Heat input for foaming may also be provided exclusively by means of the thermal treatment conduits, thus, eliminating use of an oven altogether.

The lower part of the cross-section in FIG. 11a illustrates the tubular section 30 after foaming. The cavity 9 is completely and uniformly filled with frothed foam material. It is to be noted that foaming achieves a substantial increase in the strength of the tubular section 30, in particular, its buckling strength and flexural rigidity are substantially enhanced as compared to a non-foamed tubular section of the same material and same weight.

What is claimed is:

1. A metal foam jointing method for joining preformed bodies comprising the steps:
    a) locating a first preformed body and a second preformed body in fixed positions relative to each other,
    b) forming, by means of a jointing clamp in a jointing zone of said preformed bodies, an encasement of a space in which foamable metal foam material is disposed, and
    c) foaming said metal foam material in said encasement to thus compact said preformed bodies into a composite body.

2. The metal foam jointing method as set forth in claim 1, characterized in that a separate jointing clamp is applied to said preformed bodies to thus form said encasement.

3. The metal foam jointing method as set forth in claim 1, characterized in that
    at least one joining section is configured at each preformed body,
    said preformed bodies are placed against each other with their joining sections, and
    a separate jointing clamp is placed to clasp said joining sections or a joining section of one preformed body clasps a joining section of another preformed body to thus form said jointing clamp and said encasement.

4. The metal foam jointing method as set forth in claim 1, characterized in that said foamable metal foam material is introduced in the form of a supplemental section into said encased space.

5. The metal foam jointing method as set forth in claim 1, characterized in that said metal foam material is thermally treated from within by a thermal treatment means arranged in said encased space.

6. The metal foam jointing method as set forth in claim 1, characterized in that said metal foam material, in being foamed, is charged with a fluid which diminishes or increases an oxidative effect of a foaming agent on said metal foam material through a conduit, arranged in said encased space.

7. A composite of preformed bodies, including metal foam material, characterized in that a first preformed body and a second preformed body are joined together by a jointing clamp, which forms an encasement for the metal foam material, foamed in producing said composite, and thus compacts said preformed bodies into said composite.

8. The composite as set forth in claim 7, characterized in that protruding from each preformed body is at least one joining section clasped by said jointing clamp.

9. The composite as set forth in claim 8, characterized in that a joining section forms for its preformed body an anchoring in said compacted composite.

10. The composite as set forth in claim 7, characterized in that at least one conduit, having a cross-section sufficient for the passage of a fluid, is configured in said foamed metal foam material.

11. A jointing clamp having a tubular cylindrical section, characterized in that said jointing clamp in its tubular cylindrical section is a laminate comprising an inner foam layer of a foamable metal foam material and a skin layer, sheathing said foam layer on the outside.

12. The jointing clamp as set forth in claim 11, characterized in that said tubular cylindrical section comprises an opening.

13. The jointing clamp as set forth in claim 12, characterized in that said opening runs in the longitudinal direction of said tubular cylindrical section and extends at least up to one end of said tubular cylindrical section.

14. The jointing clamp as set forth in claim 11, characterized in that configured at said tubular cylindrical section is a sustaining section for mounting said jointing clamp on a preformed body.

15. The metal foam jointing method as set forth in claim 1, wherein said jointing clamp is integral with at least one of said first preformed body or said second preformed body.

16. The composite as set forth in claim 7, wherein said jointing clamp is integral with at least one of said first preformed body or said second preformed body.

17. A jointing clamp having a tubular cylindrical section, characterized in that said jointing clamp comprises in its tubular cylindrical section a layer of a foamable metal foam material and a skin layer, sheathing said layer of a foamable metal foam material on the outside, said tubular cylindrical section comprising an opening that runs in the longitudinal direction of said tubular cylindrical section and extends at least up to one end of said tubular cylindrical section.

18. A jointing clamp having a tubular cylindrical section, characterized in that said jointing clamp comprises in its tubular cylindrical section a layer of a foamable metal foam material and a skin layer, sheathing said layer of a foamable metal foam material on the outside, and further comprising, configured at said tubular cylindrical section, a sustaining section for mounting said jointing clamp on a preformed body.

* * * * *

UNITED STATES PATENT AND TRADEMARK OFFICE
CERTIFICATE OF CORRECTION

PATENT NO.    : 6,465,111 B1
DATED         : October 15, 2002
INVENTOR(S)   : Fritz Michael Streuber It is certified that error appears in the above-identified patent and that said Letters Patent is hereby corrected as shown below:

<u>Title page,</u>
Item [56], References Cited, U.S. PATENT DOCUMENTS, delete
"5,151,246 A   9/1992   Bauneist et al.  ……..419/2",
and insert therefor
-- 5,151,246 A  9/1992   Baumeister et al.   ………...419/2 --.

FOREIGN PATENT DOCUMENTS, delete
"DE    44 26 627 C2    2/1993",
insert therefor
-- DE    44 26 627 C2    2/1995 --,
and add
-- EP    0 701 633 B1    3/1996 --.

Signed and Sealed this

Twenty-seventh Day of May, 2003

JAMES E. ROGAN
*Director of the United States Patent and Trademark Office*